(12) United States Patent
Datas et al.

(10) Patent No.: US 11,325,214 B2
(45) Date of Patent: May 10, 2022

(54) TRANSPORT TROLLEY

(71) Applicants: Airbus Operations SAS, Toulouse (FR); Airbus SAS, Blagnac (FR)

(72) Inventors: Jean-Marc Datas, Toulouse (FR); Jacques Bouriquet, Colomiers (FR); Jean-Mickael Brindeau, Blagnac (FR); André Aquila, Cornebarrieu (FR); Patrick Guibert, Plasisance du Touch (FR); Nicolas Darbonville, Toulouse (FR); Thomas Autret, Beauzelle (FR)

(73) Assignees: AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 300 days.

(21) Appl. No.: 16/580,949

(22) Filed: Sep. 24, 2019

(65) Prior Publication Data
US 2020/0101571 A1 Apr. 2, 2020

(30) Foreign Application Priority Data

Sep. 28, 2018 (FR) ...................................... 1871103

(51) Int. Cl.
 *B23Q 1/26* (2006.01)
(52) U.S. Cl.
 CPC ..................................... *B23Q 1/26* (2013.01)
(58) Field of Classification Search
 CPC ......... B23P 2700/01; B64F 5/10; B64F 5/50; B64F 5/40; B66F 7/0633
 See application file for complete search history.

(56) References Cited

U.S. PATENT DOCUMENTS

| | | | |
|---|---|---|---|
| 8,661,684 B1 | 3/2014 | Boyd et al. | |
| 9,486,917 B2 * | 11/2016 | Reid | B64F 5/10 |
| 2011/0054694 A1 | 3/2011 | Munk | |
| 2014/0157588 A1 * | 6/2014 | Boyd | B21D 53/92 29/703 |
| 2014/0353894 A1 | 12/2014 | DesJardien et al. | |
| 2017/0120443 A1 | 5/2017 | Kang et al. | |

FOREIGN PATENT DOCUMENTS

GB          2473100 A      3/2011

OTHER PUBLICATIONS

French Search Report; priority document.

* cited by examiner

*Primary Examiner* — Tyrone V Hall, Jr.
(74) *Attorney, Agent, or Firm* — Greer, Burns & Crain, Ltd.

(57) ABSTRACT

A transport trolley for transporting a load comprising a base mounted on motorized wheels, a deck mounted to be translationally mobile on the base in a direction of translation, a first motorized system displacing the deck, a hexapod platform comprising a platform and a set of six jacks in which each is mounted articulated between the deck and the platform. The platform comprises a plurality of bearing points configured to come under the load and each bearing point takes the form of a receptacle with its opening oriented upwards. A control unit controls each motorized wheel, the first motorized system and each jack. The use of a hexapod platform makes it possible to finely position the wing at its position of fixing onto the fuselage and the use of a mobile deck supporting the hexapod platform allows for adjustability of the position despite a smaller footprint around the aircraft.

9 Claims, 3 Drawing Sheets

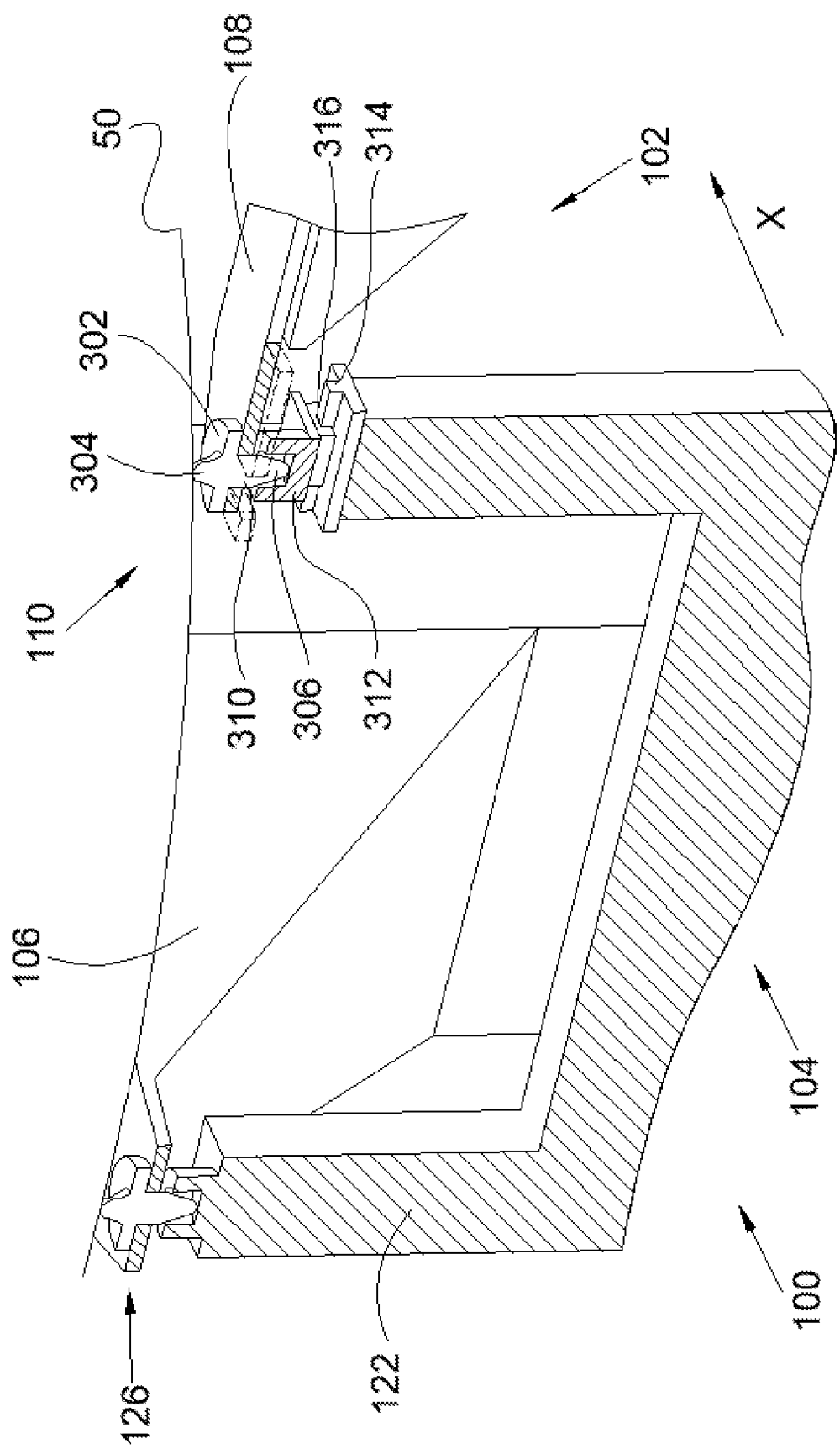

TRANSPORT TROLLEY

CROSS-REFERENCES TO RELATED APPLICATIONS

This application claims the benefit of the French patent application No. 1871103 filed on Sep. 28, 2018, the entire disclosures of which are incorporated herein by way of reference.

FIELD OF THE INVENTION

The present invention relates to a transport trolley, in particular for a wing of an aircraft, and a handling system comprising such a transport trolley.

BACKGROUND OF THE INVENTION

In the context of the assembly of a wing of an aircraft, the transporting of the wing from its place of storage to its place of assembly is done using trolleys. Each trolley supports a part of the wing and a synchronized displacement of the trolleys makes it possible to bring the wing to its position of fixing onto the fuselage.

Although such trolleys give full satisfaction, they are relatively bulky and difficult to maneuver.

SUMMARY OF THE INVENTION

One object of the present invention is to propose a transport trolley, in particular for an aircraft wing, which is less bulky and makes it possible to improve the rate of production through better maneuverability.

To this end, a transport trolley is proposed that is intended to transport a load and comprising:
- a base comprising displacement means,
- a deck mounted to be translationally mobile on the base in a direction of translation X,
- a first motorized system which displaces the deck,
- a hexapod platform which comprises a platform and a set of six jacks in which each is mounted articulated between the deck and the platform and in which the platform comprises a plurality of bearing points intended to come under the load, and
- a control unit which controls the displacement means, the first motorized system and each jack.

The use of a hexapod platform makes it possible to finely position the wing at its position of fixing onto the fuselage and the use of a mobile deck supporting the hexapod platform allows for an adjustment of the position despite a smaller footprint around the aircraft.

Advantageously, each bearing point takes the form of a receptacle with its opening oriented upwards.

Advantageously, the transport trolley comprises a first receptacle fixed onto the platform and a second receptacle that is translationally mobile in a direction of adjustment parallel to the line passing through the center of the two receptacles.

Advantageously, the transport trolley comprises a yoke joint mounted on the platform, a rocker arm mounted to be rotationally mobile on the yoke joint and two receptacles in which each is arranged at an end of the rocker arm.

Advantageously, the yoke joint is mounted on the platform via a compound sliding stage.

Advantageously, the transport trolley comprises an additional platform mounted to be translationally mobile on the base, an articulated arm, motorized and fixed by one of its ends onto the additional platform, a camera which is mounted at another end of the arm, and a second motorized system which displaces the additional platform, and in which the control unit controls the camera, the arm and the second motorized system.

The invention also proposes a handling system comprising a holding station and a transport trolley according to one of the preceding variants, in which the holding station comprises a plurality of posts in which each is anchored in the ground and in which the top part of each post has a pallet with at least one slit and which, for each slit, bears a block, in which each block comprises a shoulder bearing on the pallet, a rounded part extending above the shoulder and intended to support the load, and a trunk extending under the shoulder and which is inserted into the slit, and in which for each block, the transport trolley comprises a receptacle whose depth is less than the length of the trunk extending under the pallet.

According to a particular embodiment, each slit has an opening at one of its ends and all the openings are oriented in the same direction.

According to another particular embodiment, each slit has an opening at one of its ends, the slits of at least one post are oriented in the same direction, the slits of at least one other post are oriented in another direction, and the top part of each other post is rotationally mobile about a vertical axis.

BRIEF DESCRIPTION OF THE DRAWINGS

The features of the invention mentioned above, and others, will become more clearly apparent on reading the following description of an exemplary embodiment, the description being given in relation to the attached drawings, in which:

FIG. 3 is a perspective view and in cross section along the plane III of FIG. 1 when the transport trolley is in position to raise the wing.

DETAILED DESCRIPTION OF THE PREFERRED EMBODIMENTS

Figure 1:
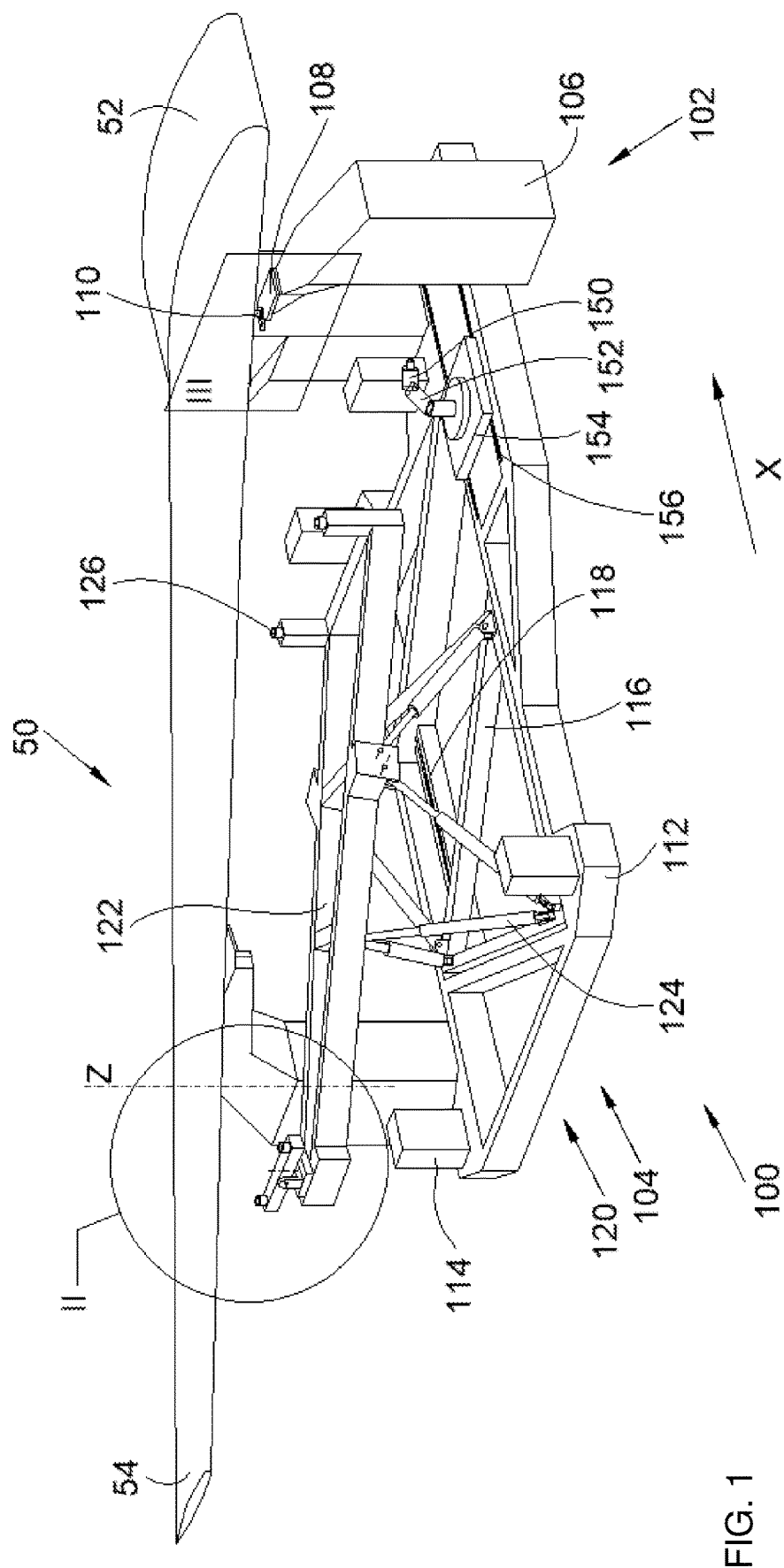
FIG. 1 is a perspective view of a handling system according to the invention.

In the following description, the terms relating to a position are taken with reference to a transport trolley bearing an object, here an aircraft wing, that is to say, as is represented in FIG. 1. In the following description, the handling system is used for an aircraft wing, but it can be used for any other load.

FIG. 1 shows a handling system 100 which comprises a holding station 102 and a transport trolley 104.

The holding station 102 makes it possible to support the wing 50 of the aircraft while waiting for the wing 50 to be loaded on the transport trolley 104.

The wing 50 conventionally has a proximal end 52 which is the end which is configured to be fixed to the fuselage of the aircraft and a distal end 54 which is the other end of the wing 50.

The holding station 102 comprises a plurality of posts 106 in which, for each post 106, the bottom part is anchored in the ground and the top part has a pallet 108 which is, here, horizontal and which bears at least one vertical block 110 which itself supports the wing 50.

In the embodiment of the invention presented in FIG. 1, there are three posts 106 which are distributed with two posts 106 on the side of the proximal end which is the widest and one post 106 on the side of the distal end which is the least wide. Obviously, a different arrangement and number of posts 106 can be envisaged depending on the load 50.

The transport trolley 104 comprises a base 112 which comprises displacement means which ensure the displacement of the transport trolley 104. The displacement means here take the form of motorized wheels, in this case four of them. The motorized wheels are represented here by blocks 114, each containing a motor and a wheel driven by the motor. The displacement means can take other forms such as, for example, an air cushion generator.

The transport trolley 104 comprises a deck 116 which is mounted to be translationally mobile on the base 112 in a direction of translation X. The transport trolley 104 comprises a first motorized system which displaces the deck 116 in translation.

The guiding of the deck 116 is provided by any appropriate means such as, for example, rails 118 fixed to the base 112 parallel to the direction of translation X.

The transport trolley 104 comprises a hexapod platform 120 (also called Stewart platform) which comprises a platform 122 and a set of six jacks 124 in which each is mounted articulated between the plate 116 and the platform 122. The platform 122 is the element which receives the wing 50 to be transported.

The positioning of the jacks 124 is conventional, that is to say, in pyramid form between the deck 116 and the platform 122.

The platform 122 comprises a plurality of bearing points 126 which are configured to come under the wing 50 to support it as is described herein.

The transport trolley 104 comprises a control unit which controls the displacement means, here each motorized wheel 114, the first motorized system and each jack 124 of the hexapod platform 120.

The operation of the handling system 100 comprises fetching the wing 50 which rests on the holding station 102 with the transport trolley 104, in loading the wing 50 onto the transport trolley 104 and in transporting it with the transport trolley 104 to the place of fixing.

The displacement of the deck 116 parallel to the direction of translation X makes it possible to adjust its position relative to the wing 50 for the loading and to adjust the position of the wing 50 relative to the fuselage for the fixing of the wing 50 without it being necessary to displace the base 112, thus limiting the need for a significant space around the transport trolley 104.

When the wing 50 is being mounted, the base 112 is positioned so as to present its direction of translation X at right angles to the longitudinal direction of the fuselage of the aircraft.

The use of a hexapod platform 120 allows for an accurate positioning of the platform 122 when the wing 50 is being loaded and an accurate positioning of the wing 50 when it is being fixed to the fuselage.

Figure 2:
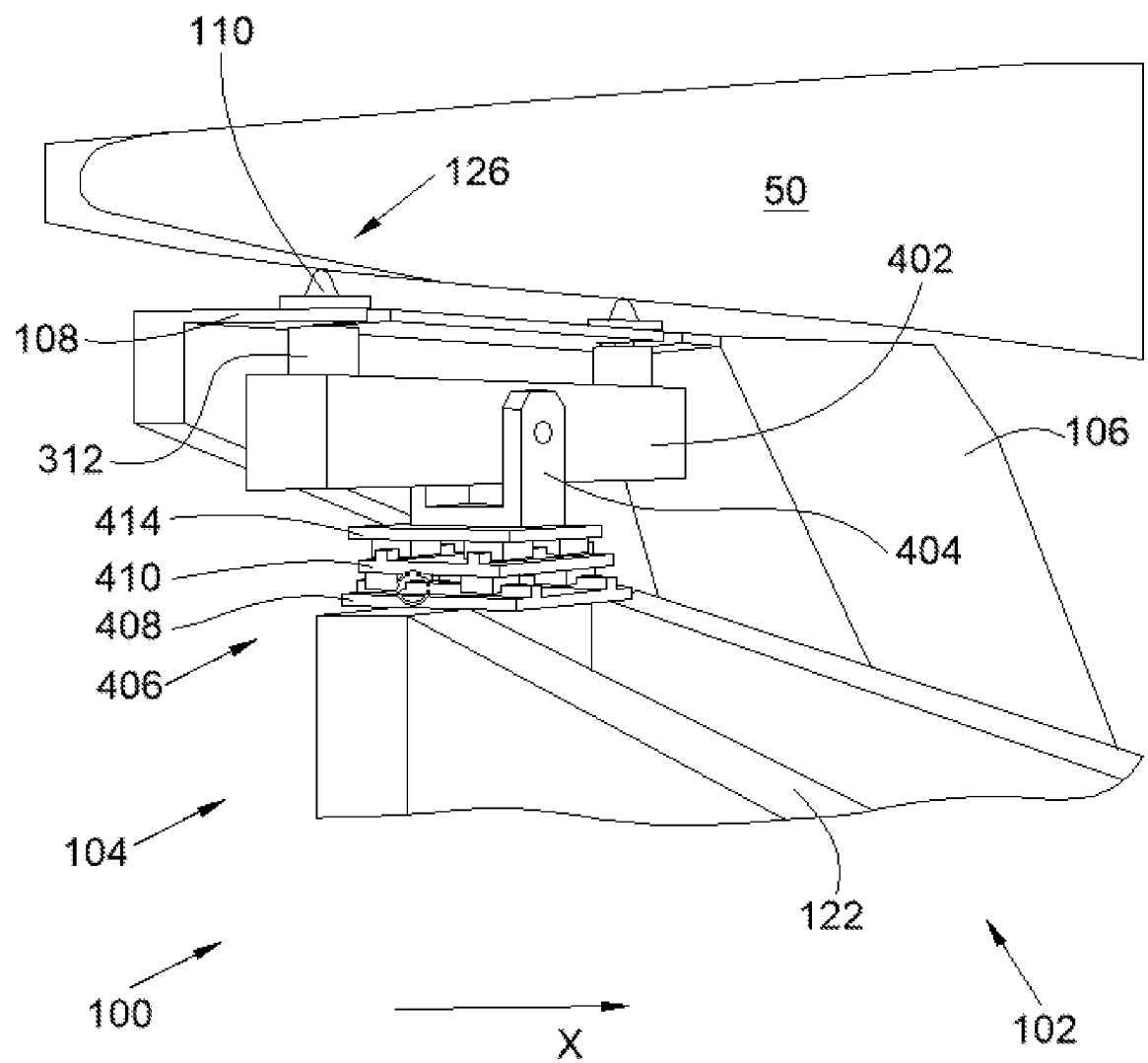
FIG. 2 is a perspective view of the detail II of FIG. 1.

FIG. 2 shows the transfer of the wing from the holding station 102 to the transport trolley 104 at the post 106 on the side of the distal end and FIG. 3 shows the transfer of the wing from the holding station 102 to the transport trolley 104 at the posts 106 on the side of the proximal end.

On the side of the distal end, the post 106 bears two blocks 110 and on the side of the proximal end, each of the two posts 106 bears one block 110.

Each block 110 comprises a shoulder 302 which serves as bearing surface on the pallet 108, a rounded part 304 which extends above the shoulder 302 and on which the wing 50 bears and a trunk 306 which extends under the shoulder 302 and which is inserted into a slit 310 of the pallet 108. Each pallet 108 has at least one slit 310 and, for each slit 310, the pallet 108 bears a block 110.

In FIG. 3, the chain-dotted lines represent the part of the pallet 108 which has been cut.

Thus, each block 110 is inserted into a slit 310 of a pallet 108 with the shoulder 302 which bears on the pallet 108 and the wing 50 which is bearing on the rounded part 304.

For each block 110, the transport trolley 104 comprises a hollow receptacle 312 whose depth is less than the length of the trunk 306 extending under the pallet 108. Each receptacle 312 is positioned with its opening oriented upwards under a block 110. Each receptacle 312 constitutes a bearing point 126.

When the platform 122 is raised, each trunk 306 is introduced into a receptacle 312 and, because of the difference in length, the trunk 306 comes into abutment against the bottom of the receptacle 312 which causes the block 110, and therefore the wing 50, to be raised. In addition, each receptacle 312 ensures the centering of the trunk 306 which penetrates therein.

The block 110 is then no longer bearing on the pallet 108 and it is transferred onto the transport trolley 104. It is then possible to displace the transport trolley 104 with the wing 50.

To allow the releasing of the blocks 110, each slit 310 has an opening at one of its ends.

According to a particular embodiment, not represented, all the slits are oriented in the same direction. For example, all the slits 310 are open in the opposite direction to the arrow representing the direction of translation X. Thus, after the lifting of the wing 50, a displacement of the base 112 and/or of the deck 116 makes it possible, in the opposite direction to the arrow representing the direction of translation X, to extract the blocks 110 from the slits 310 and thus release the wing 50 from the holding station 102.

According to another variant, a different position of the posts 106 could make it possible to have a slit opening oriented in the direction of the arrow representing the direction of translation X.

In the embodiment of the invention presented in FIGS. 2 and 3, the openings of the slits 310 which are on the side of the proximal end 52 are oriented towards the slits 310 which are on the side of the distal end 54.

To allow a releasing of the slits, the top part of the post 106, which is on the side of the distal end 54, is rotationally mobile about a vertical axis Z which makes it possible to release the pallet 108.

Thus, generally, each slit 310 has an opening at one of its ends, the slits 310 of at least one post 106 are oriented in the same direction, the slits 310 of at least one other post 106 are oriented in another direction, and the top part of each other post 106 is rotationally mobile about the vertical axis Z.

In the embodiment of the invention presented in FIG. 3, and on the side of the proximal end 52, there is a first receptacle 312 which is fixed onto the platform 122 in order to serve as reference point and a second receptacle 312 which is translationally mobile in a direction of adjustment parallel to the line passing through the center of the two receptacles 312 in order to adjust the position of this second receptacle 312.

The displacement of the second bearing point 126 is ensured by any appropriate means, such as, for example, the placement of a rib 314 integral to the platform 122 and parallel to the direction of adjustment and of a groove 316 produced under the receptacle 312 and in which the rib 314 is engaged. Obviously, a reverse mounting is possible.

In the embodiment of the invention presented in FIG. 2, and on the side of the distal end 54, there are two receptacles 312, in which each is arranged at an end of a rocker arm 402 which is mounted to be rotationally mobile on a yoke joint 404 about an axis of rotation which is, here, overall parallel to the direction of translation X. The yoke joint 404 is mounted on the platform 122.

The arrangement of two bearing points 126 at a distance from one another on the side of the proximal end 52 and of two bearing points 126 tight together on the side of the distal end 54 and mounted on the rocker arm 402 allows for an isostatic support of the wing 50.

According to a particular embodiment, on the receptacles 312 which are mounted on the rocker arm 402 is fixed, and the other receptacle 312 is mobile in translation parallel to the longitudinal axis of the rocker arm 402, i.e., parallel to the direction passing through the two receptacles 312.

In order to best adjust the position of the receptacles 312, the yoke joint 404 is mounted on the platform 122 via a compound sliding stage 406. The compound sliding stage 406 allows the displacement of the yoke joint 404 in two orthogonal and horizontal directions. In the embodiment of the invention presented here, the compound sliding stage 406 is produced by the cooperation of ribs and grooves, but other embodiments are possible.

In the embodiment presented here, the compound sliding stage 406 has a first plate 408 secured to the platform 122 and provided with ribs parallel to a first direction of translation, an intermediate plate 410 of which one face is provided with grooves cooperating with the ribs of the first plate 408 and of which the other face is provided with ribs parallel to a second direction of translation, and a second plate 414 secured to the yoke joint 404 and provided with grooves cooperating with the ribs of the intermediate plate 410.

The transport trolley 104 is equipped with at least one camera 150 which is mounted at an end of an arm 152 which is articulated and motorized. The other end of the arm 152 is fixed onto an additional platform 154 which is mounted to be translationally mobile on the base 112, here parallel to the direction of translation X.

The transport trolley 104 comprises a second motorized system which displaces the additional platform 154 in translation.

The guiding of the additional platform 154 is provided by any appropriate means such as, for example, rails 156 fixed to the base 112 parallel to the direction of translation X.

The camera 150, the arm 152 and the second motorized system are controlled by the control unit.

The control unit comprises, linked by a communication bus: a processor or CPU (central processing unit); a random access memory RAM; a read-only memory ROM; a storage unit such as a hard disk or a storage medium reader, such as an SD card reader 204 (SD for "Secure Digital"); at least one communication interface, allowing the control unit to communicate with each motorized wheel 114, the first and the second motorized systems, each jack 124, the arm 152 and the camera 150.

The processor is capable of executing instructions loaded into the RAM from the ROM, from an external memory (not represented), from a storage medium (such as an SD card), or from a communication network. When the equipment is powered up, the processor is capable of reading instructions from the RAM and of executing them. These instructions form a computer program causing the implementation, by the processor, of all or part of the algorithms and steps allowing for the operation of the handling system 100.

All or part of the algorithms and steps can be implemented in software form by the execution of a set of instructions by a programmable machine, for example a DSP (digital signal processor) or a microcontroller, or be implemented in hardware form by a dedicated machine or component, for example an FGPA (field-programmable gate array) or an ASIC (application-specific integrated circuit).

In order to allow an automatic displacement of the transport trolley 104, the transport trolley 104 is equipped with an internal geolocation system which allows for a first location. Targets can also be positioned on the ground. The camera 150 then views these different targets and can, via the control unit, command the motorized wheels 114 to displace and position the transport trolley 104 relative to these targets. The targets allow for a more accurate location.

Thus, when the transport trolley 104 is being placed to load the wing 50, the internal geolocation system allows a first positioning between the posts 106 and the camera allows a more accurate location by recognition of the targets.

The targets can also be placed on the base 112 and the platform 122. Thus, via the camera 150, the control unit knows the positions of these elements and can correct them if necessary. The placement of such targets on the base 112 and the platform 122 allows for an automatic displacement when the wing 50 is being loaded and when it is being positioned for mounting.

In the case of the assembly of the two wings 50 of an aircraft, the use of a transport trolley 104 for each wing 50 makes it possible to position each wing 50 on either side of a central rib of the structure of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A transport trolley configured to transport a load and comprising:
    a base comprising displacement means,
    a deck mounted to be translationally mobile on the base in a direction of translation,
    a first motorized system which displaces the deck,
    a hexapod platform which comprises a platform and a set of six jacks in which each is mounted articulated between the deck and the platform and in which the platform comprises a plurality of bearing points configured to come under the load, and
    a control unit which controls the displacement means, the first motorized system and each jack.

2. The transport trolley according to claim 1, wherein each bearing point takes the form of a receptacle having an opening oriented upwards.

3. The transport trolley according to claim 2, further comprising a first receptacle fixed onto the platform and a second receptacle translationally mobile in a direction of adjustment parallel to a line passing through a center of the first and second receptacles.

4. The transport trolley according to claim 1, further comprising an additional platform mounted to be translationally mobile on the base, an articulated arm, motorized and fixed by an end thereof onto the additional platform, a camera which is mounted at another end of the arm, and a second motorized system which displaces the additional platform, and in which the control unit controls the camera, the arm and the second motorized system.

5. A handling system comprising a holding station and a transport trolley, the transport trolley comprising:
- a base comprising displacement means,
- a deck mounted to be translationally mobile on the base in a direction of translation,
- a first motorized system which displaces the deck,
- a hexapod platform which comprises a platform and a set of six jacks in which each is mounted articulated between the deck and the platform and in which the platform comprises a plurality of bearing points configured to come under the load, and
- a control unit which controls the displacement means, the first motorized system and each jack, wherein each bearing point takes the form of a receptacle having an opening oriented upwards,
- wherein the holding station comprises a plurality of posts in which each is anchored in the ground and in which a top part of each post has a pallet with at least one slit and in which, for each slit, the pallet bears a block, in which each block comprises a shoulder bearing on the pallet, a rounded part extending above the shoulder and configured to support the load, and a trunk extending under the shoulder and which is inserted into the slit, and in which, for each block, the transport trolley comprises a receptacle whose depth is less than a length of the trunk extending under the pallet.

6. The handling system according to claim 5, wherein each slit has an opening at one of its ends and in that all the openings are oriented in the same direction.

7. The handling system according to claim 5, wherein each slit has an opening at one of its ends, wherein at least one post has multiple slits, the slits of the at least one post being oriented in a same direction, wherein at least one other post has multiple slits, the slits of the at least one other post being oriented in another direction, and wherein the top part of each at least one other post is rotationally mobile about a vertical axis.

8. A transport trolley configured to transport a load and comprising:
- a base comprising displacement means,
- a deck mounted to be translationally mobile on the base in a direction of translation,
- a first motorized system which displaces the deck,
- a hexapod platform which comprises a platform and a set of six jacks in which each is mounted articulated between the deck and the platform and in which the platform comprises a plurality of bearing points configured to come under the load, and
- a control unit which controls the displacement means, the first motorized system and each jack,
- wherein each bearing point takes the form of a receptacle having an opening oriented upwards, and
- wherein the transport trolley further comprises a yoke joint mounted on the platform, a rocker arm mounted to be rotationally mobile on the yoke joint and two receptacles in which each of the two receptacles is arranged at an end of the rocker arm.

9. The transport trolley according to claim 8, wherein the yoke joint is mounted on the platform via a compound sliding stage.

\* \* \* \* \*